United States Patent
Huang et al.

(10) Patent No.: US 10,853,807 B2
(45) Date of Patent: Dec. 1, 2020

(54) PAYMENT AUTHENTICATION METHOD AND APPARATUS

(71) Applicant: Huawei Technologies Co., Ltd., Shenzhen (CN)

(72) Inventors: Xueyan Huang, Shenzhen (CN); Rusong Jia, Shenzhen (CN); Kangmin Huang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 637 days.

(21) Appl. No.: 15/669,517

(22) Filed: Aug. 4, 2017

(65) Prior Publication Data
US 2017/0357969 A1 Dec. 14, 2017

Related U.S. Application Data

(63) Continuation of application No. PCT/CN2016/070404, filed on Jan. 7, 2016.

(30) Foreign Application Priority Data

Feb. 4, 2015 (CN) .......................... 2015 1 0059922

(51) Int. Cl.
*G06Q 40/00* (2012.01)
*G06Q 20/40* (2012.01)
(Continued)

(52) U.S. Cl.
CPC ............. *G06Q 20/40* (2013.01); *G06F 21/31* (2013.01); *G07F 19/207* (2013.01)

(58) Field of Classification Search
CPC ..... G06Q 20/20; G06Q 20/4014; G06F 21/33
(Continued)

(56) References Cited

U.S. PATENT DOCUMENTS 9,436,335 B1* 9/2016 Scherer ................. G06F 3/0412
2002/0038818 A1 4/2002 Zingher et al.
(Continued)

FOREIGN PATENT DOCUMENTS

CN 1441380 A 9/2003
CN 102880955 A 1/2013
(Continued)

OTHER PUBLICATIONS

Foreign Communication From a Counterpart Applicatio, European Application No. 16746058.3, Partial Supplementary European Search Report dated Nov. 29, 2017, 13 pages.
(Continued)

*Primary Examiner* — Daniel St Cyr
(74) *Attorney, Agent, or Firm* — Conley Rose, P.C.

(57) ABSTRACT

A payment authentication method and apparatus, where the method includes obtaining authentication information entered by a user during payment, obtaining emotion characteristic information or action characteristic information when the user enters the authentication information, determining, according to the emotion characteristic information or the action characteristic information, whether a payment scenario is a normal payment scenario when the authentication information is valid, performing security control on the payment according to a result of determining whether the payment scenario is a normal payment scenario. Hence, according to the payment authentication method and apparatus, whether the payment scenario is the normal payment scenario is determined by obtaining emotion characteristic information or action characteristic information when the user enters authentication information during payment, and security control is performed on the payment according to a determining result, which improve security of the payment.

20 Claims, 6 Drawing Sheets

(51) Int. Cl.
*G07F 19/00* (2006.01)
*G06F 21/31* (2013.01)

(58) Field of Classification Search
USPC .......................................... 235/379, 380, 383
See application file for complete search history.

(56) References Cited

U.S. PATENT DOCUMENTS

| | | | |
|---|---|---|---|
| 2003/0037264 | A1 | 2/2003 | Ezaki et al. |
| 2008/0091453 | A1* | 4/2008 | Meehan ............ G06Q 20/40145 |
| | | | 705/317 |
| 2012/0169872 | A1 | 7/2012 | Williamson |
| 2013/0144731 | A1* | 6/2013 | Baldwin ................ G06Q 20/20 |
| | | | 705/17 |
| 2013/0159194 | A1* | 6/2013 | Habib ..................... G06F 21/32 |
| | | | 705/66 |
| 2013/0290185 | A1 | 10/2013 | Sung et al. |
| 2014/0058763 | A1* | 2/2014 | Zizzamia ............... G06Q 40/08 |
| | | | 705/4 |
| 2015/0235226 | A1 | 8/2015 | Mao |
| 2016/0342241 | A1* | 11/2016 | Chung .................. G06F 3/0416 |
| 2018/0226565 | A1* | 8/2018 | Matsumoto .............. B62D 6/10 |
| 2019/0051144 | A1* | 2/2019 | David .................... G16H 20/30 |

FOREIGN PATENT DOCUMENTS

| | | |
|---|---|---|
| CN | 103258270 A | 8/2013 |
| CN | 103295129 A | 9/2013 |
| CN | 103886453 A | 6/2014 |
| CN | 103927658 A | 7/2014 |
| CN | 104091109 A | 10/2014 |
| CN | 104102925 A | 10/2014 |
| CN | 104143139 A | 11/2014 |
| CN | 104156446 A | 11/2014 |
| CN | 104574088 A | 4/2015 |
| EP | 1246146 A2 | 10/2002 |

OTHER PUBLICATIONS

Machine Translation and Abstract of Chinese Publication No. CN1441380, Sep. 10, 2003, 7 pages.
Machine Translation and Abstract of Chinese Publication No. CN103258270, Aug. 21, 2013, 13 pages.
Machine Translation and Abstract of Chinese Publication No. CN103295129, Sep. 11, 2013, 17 pages.
Machine Translation and Abstract of Chinese Publication No. CN103886453, Jun. 25, 2014, 17 pages.
Machine Translation and Abstract of Chinese Publication No. CN103927658, Jul. 16, 2014, 18 pages.
Machine Translation and Abstract of Chinese Publication No. CN104091109, Oct. 8, 2014, 7 pages.
Machine Translation and Abstract of Chinese Publication No. CN104102925, Oct. 15, 2014, 12 pages.
Machine Translation and Abstract of Chinese Publication No. CN104143139, Nov. 12, 2014, 12 pages.
Machine Translation and Abstract of Chinese Publication No. CN104156446, Nov. 19, 2014, 14 pages.
Machine Translation and Abstract of Chinese Publication No. CN104574088, Apr. 29, 2015, 40 pages.
Zhang, X., "EmoSpark," Jan. 21, 2014, 2 pages.
English Translation of Zhang, X., "EmoSpark," Jan. 21, 2014, 2 pages.
"Emotional Detector," May 26, 2014, 2 pages.
English Translation of "Emotional Detector," May 26, 2014, 2 pages.
"Fingerprint Payment Appeared Capital Restaurant," Sep. 3, 2014, 2 pages.
English Translation of "Fingerprint Payment Appeared Capital Restaurant," Sep. 3, 2014, 2 pages.
"Microsofts New Technology: Smartphones Detect User Mood," Sina Science and Technology, Jul. 1, 2013, 2 pages.
English Translation of "Microsofts New Technology: Smartphones Detect User Mood," Sina Science and Technology, Jul. 1, 2013, 2 pages.
Foreign Communication From a Counterpart Application, Chinese Application No. 201510059922.4, Chinese Search Report dated May 9, 2017, 2 pages.
Foreign Communication From a Counterpart Application, Chinese Application No. 201510059922.4, Chinese Office Action dated May 24, 2017, 6 pages.
Foreign Communication From a Counterpart Application, PCT Application No. PCT/CN2016/070404, English Translation of International Search Report dated Apr. 11, 2016, 2 pages.
Foreign Communication From a Counterpart Application, PCT Application No. PCT/CN2016/070404, English Translation of Written Opinion dated Apr. 11, 2016, 8 pages.
Foreign Communication From a Counterpart Application, European Application No. 16746058.3, Extended European Search Report dated Feb. 26, 2018, 12 pages.

\* cited by examiner

PAYMENT AUTHENTICATION METHOD AND APPARATUS

CROSS-REFERENCE TO RELATED APPLICATIONS

This application is a continuation of International Patent Application No. PCT/CN2016/070404 filed on Jan. 7, 2016, which claims priority to Chinese Patent Application No. 201510059922.4 filed on Feb. 4, 2015. The disclosures of the aforementioned applications are hereby incorporated by reference in their entireties.

TECHNICAL FIELD

The present disclosure relates to the payment field, and in particular, to a payment authentication method and apparatus in the payment field.

BACKGROUND

Nowadays, the mobile Internet gradually becomes a part of people's daily life. More people start online shopping and payment. Therefore, conventional payment manners such as cash and checks are being replaced with various new mobile payment manners. For example, swiping a card using a point of sales (POS), performing withdrawal or transfer using a self-service financial terminal, or performing payment using a mobile terminal such as a smartphone or a wearable device has gradually become a trend.

However, because the foregoing payment manners are usually used in a scenario in which population density is not high, users may be forced to make a payment behavior contrary to their own wishes during payment. Especially, a mobile terminal such as a smartphone or a wearable device usually does not have a conventional input apparatus such as a keyboard, operation space is relative small, and a conventional manner for entering a password is extremely inconvenient. Therefore, fingerprint payment that is relatively secure and fast becomes popular.

The fingerprint payment still has some disadvantages. For example, a criminal may perform payment using forged fingerprint information or a chopped-off finger. In the newest fingerprint payment, a management program, an encryption program, a verification program, and a storage program of fingerprint information are run in a trust zone of a chip of a mobile terminal, and technologies such as 2048-bit RSA key signature protection and 256-bit advanced encryption standard (AES) algorithm encryption and storage are used such that a problem of fingerprint forgery is resolved to a large extent. However, even so, a criminal may still obtain property of a user by forcing the user to press a finger.

SUMMARY

Embodiments of the present disclosure provide a payment authentication method and apparatus in order to improve security of payment.

According to a first aspect, a payment authentication method is provided, including obtaining authentication information entered by a user during payment and emotion characteristic information that is generated when the user enters the authentication information, determining, according to the emotion characteristic information, whether a payment scenario is a normal payment scenario when the authentication information is valid, and performing security control on the payment according to a result of determining whether the payment scenario is a normal payment scenario.

With reference to the first aspect, in a first possible implementation manner of the first aspect, determining, according to the emotion characteristic information, whether a payment scenario is a normal payment scenario includes comparing the emotion characteristic information with reference emotion characteristic information, and determining, according to a comparison result, whether the payment scenario is a normal payment scenario.

With reference to the first aspect or the first possible implementation manner of the first aspect, in a second possible implementation manner of the first aspect, performing security control on the payment according to a result of determining whether the payment scenario is a normal payment scenario includes photographing or videotaping a site of the payment when the payment scenario is not a normal payment scenario.

With reference to any one of the first aspect or the first and the second possible implementation manners of the first aspect, in a third possible implementation manner of the first aspect, performing security control on the payment according to a result of determining whether the payment scenario is a normal payment scenario includes sending help information to a preset contact when the payment scenario is not a normal payment scenario such that the contact determines a location of the payment scenario according to the help information.

With reference to the first aspect or the first possible implementation manner of the first aspect, in a fourth possible implementation manner of the first aspect, performing security control on the payment according to a result of determining whether the payment scenario is a normal payment scenario includes allowing the payment to be completed when the payment scenario is a normal payment scenario.

With reference to any one of the first aspect or the first to the fourth possible implementation manners of the first aspect, in a fifth possible implementation manner of the first aspect, obtaining emotion characteristic information that is generated when the user enters the authentication information includes generating the emotion characteristic information according to a facial expression when the user enters the authentication information.

With reference to any one of the first aspect or the first to the fifth possible implementation manners of the first aspect, in a sixth possible implementation manner of the first aspect, obtaining emotion characteristic information that is generated when the user enters the authentication information includes generating the emotion characteristic information according to a sound when the user enters the authentication information, where the emotion characteristic information includes at least one of tone information, speed information, amplitude information, or frequency information of the sound.

With reference to any one of the first aspect or the first to the sixth possible implementation manners of the first aspect, in a seventh possible implementation manner of the first aspect, obtaining emotion characteristic information that is generated when the user enters the authentication information includes generating the emotion characteristic information according to a sign when the user enters the authentication information, where the emotion characteristic information includes at least one of body temperature information, pulse information, respiration information, blood pressure information, blood oxygen information, or heart rate information.

According to a second aspect, a payment authentication method is provided, including obtaining authentication information entered by a user during payment and action characteristic information when the user enters the authentication information, determining, according to the action characteristic information, whether a payment scenario is a normal payment scenario when the authentication information is valid, and performing security control on the payment according to a result of determining whether the payment scenario is a normal payment scenario.

With reference to the second aspect, in a first possible implementation manner of the second aspect, determining, according to the action characteristic information, whether a payment scenario is a normal payment scenario includes comparing the action characteristic information with proper action characteristic information, and determining, according to a comparison result, whether the payment scenario is a normal payment scenario.

With reference to the second aspect or the first possible implementation manner of the second aspect, in a second possible implementation manner of the second aspect, performing security control on the payment according to a result of determining whether the payment scenario is a normal payment scenario includes photographing or videotaping a site of the payment when the payment scenario is not a normal payment scenario.

With reference to any one of the second aspect or the first and the second possible implementation manners of the second aspect, in a third possible implementation manner of the second aspect, performing security control on the payment according to a result of determining whether the payment scenario is a normal payment scenario includes sending help information to a preset contact when the payment scenario is not a normal payment scenario such that the contact determines a location of the payment scenario according to the help information.

With reference to the second aspect or the first possible implementation manner of the second aspect, in a fourth possible implementation manner of the second aspect, performing security control on the payment according to a result of determining whether the payment scenario is a normal payment scenario includes allowing the payment to be completed when the payment scenario is a normal payment scenario.

With reference to any one of the second aspect or the first to the fourth possible implementation manners of the second aspect, in a fifth possible implementation manner of the second aspect, the authentication information is fingerprint information, and the action characteristic information includes at least one of force information, speed information, touch area information, displacement information, or particular finger information of pressing with a finger when fingerprint payment is used.

According to a third aspect, a payment authentication apparatus is provided, including an obtaining module configured to obtain authentication information entered by a user during payment and emotion characteristic information that is generated when the user enters the authentication information, a determining module configured to determine, according to the emotion characteristic information obtained by the obtaining module, whether a payment scenario is a normal payment scenario when the authentication information obtained by the obtaining module is valid, and a control module configured to perform security control on the payment according to a result of determining, by the determining module, whether the payment scenario is a normal payment scenario.

With reference to the third aspect, in a first possible implementation manner of the third aspect, the determining module is further configured to compare the emotion characteristic information obtained by the obtaining module with reference emotion characteristic information when the authentication information obtained by the obtaining module is valid, and determine, according to a comparison result, whether the payment scenario is a normal payment scenario.

With reference to the third aspect or the first possible implementation manner of the third aspect, in a second possible implementation manner of the third aspect, the control module is further configured to photograph or videotape a site of the payment when the payment scenario is not a normal payment scenario.

With reference to any one of the third aspect or the first and the second possible implementation manners of the third aspect, in a third possible implementation manner of the third aspect, the control module is further configured to send help information to a preset contact such that the contact determines a location of the payment scenario according to the help information when the payment scenario is not a normal payment scenario.

With reference to the third aspect or the first possible implementation manner of the third aspect, in a fourth possible implementation manner of the third aspect, the control module is further configured to allow the payment to be completed when the payment scenario is a normal payment scenario.

With reference to any one of the third aspect or the first to the fourth possible implementation manners of the third aspect, in a fifth possible implementation manner of the third aspect, the obtaining module is further configured to obtain the authentication information entered by the user during the payment and a facial expression when the user enters the authentication information, and generate the emotion characteristic information according to the facial expression when the user enters the authentication information.

With reference to any one of the third aspect or the first to the fifth possible implementation manners of the third aspect, in a sixth possible implementation manner of the third aspect, the obtaining module is further configured to obtain the authentication information entered by the user during the payment and a sound when the user enters the authentication information, and generate the emotion characteristic information according to the sound when the user enters the authentication information, where the emotion characteristic information includes at least one of tone information, speed information, amplitude information, or frequency information of the sound.

With reference to any one of the third aspect or the first to the sixth possible implementation manners of the third aspect, in a seventh possible implementation manner of the third aspect, the obtaining module is further configured to obtain the authentication information entered by the user during the payment and a sign when the user enters the authentication information, and generate the emotion characteristic information according to the sign when the user enters the authentication information, where the emotion characteristic information includes at least one of body temperature information, pulse information, respiration information, blood pressure information, blood oxygen information, or heart rate information.

According to a fourth aspect, a payment authentication apparatus is provided, including an obtaining module configured to obtain authentication information entered by a user during payment and action characteristic information when the user enters the authentication information, a determining module configured to determine, according to the action characteristic information obtained by the obtaining module, whether a payment scenario is a normal payment scenario when the authentication information obtained by the obtaining module is valid, and a control module configured to perform security control on the payment according to a result of determining, by the determining module, whether the payment scenario is a normal payment scenario.

With reference to the fourth aspect, in a first possible implementation manner of the fourth aspect, the determining module is further configured to compare the action characteristic information obtained by the obtaining module with proper action characteristic information when the authentication information obtained by the obtaining module is valid, and determine, according to a comparison result, whether the payment scenario is a normal payment scenario.

With reference to the fourth aspect or the first possible implementation manner of the fourth aspect, in a second possible implementation manner of the fourth aspect, the control module is further configured to photograph or videotape a site of the payment when the payment scenario is not a normal payment scenario.

With reference to any one of the fourth aspect or the first and the second possible implementation manners of the fourth aspect, in a third possible implementation manner of the fourth aspect, the control module is further configured to send help information to a preset contact when the payment scenario is not a normal payment scenario such that the contact determines a location of the payment scenario according to the help information.

With reference to the fourth aspect or the first possible implementation manner of the fourth aspect, in a fourth possible implementation manner of the fourth aspect, the control module is further configured to allow the payment to be completed when the payment scenario is a normal payment scenario.

With reference to any one of the fourth aspect or the first to the fourth possible implementation manners of the fourth aspect, in a fifth possible implementation manner of the fourth aspect, the authentication information is fingerprint information, and the action characteristic information includes at least one of force information, speed information, touch area information, displacement information, or particular finger information of pressing with a finger when fingerprint payment is used.

Based on the foregoing technical solutions, according to the payment authentication method and apparatus provided in the embodiments of the present disclosure, whether a payment scenario is a normal payment scenario is determined by obtaining emotion characteristic information or action characteristic information when a user enters authentication information during payment, and security control is performed on the payment according to a determining result. This can improve security of the payment.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that payment involved in the embodiments of the present disclosure is generalized payment, including payment performed using various terminals having a payment function, for example, a POS machine of a merchant, or a smartphone or a wearable device used by a user, and further including withdrawal and transfer that are performed using a self-service financial terminal such as an automatic teller machine (ATM). This is not limited in the embodiments of the present disclosure.

Figure 1:
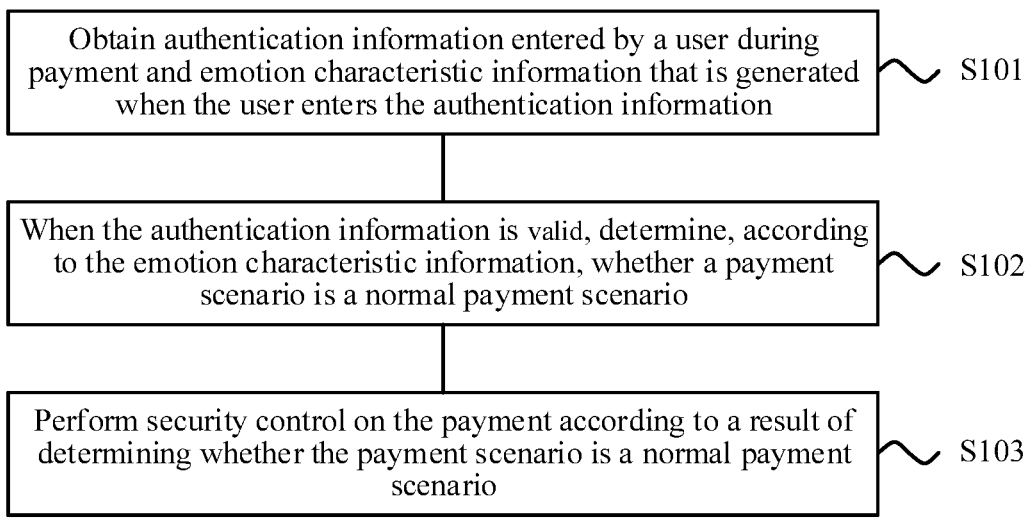
FIG. 1 is a schematic flowchart of a payment authentication method according to an embodiment of the present disclosure.

FIG. 1 is a schematic flowchart of a payment authentication method 100 according to an embodiment of the present disclosure. The method 100 is executed by a payment authentication apparatus, for example, an apparatus built in a terminal, or an independent device in communication and connection with a terminal. As shown in FIG. 1, the method 100 includes the following steps.

Step S101: Obtain authentication information entered by a user during payment and emotion characteristic information that is generated when the user enters the authentication information.

Step S102: When the authentication information is valid, determine, according to the emotion characteristic information, whether a payment scenario is a normal payment scenario.

Step S103: Perform security control on the payment according to a result of determining whether the payment scenario is a normal payment scenario.

Further, in the payment authentication in step S101, when the authentication information entered by the user is obtained, the emotion characteristic information that is generated when the user enters the authentication information is also obtained. The authentication information may include a password, a gesture, voice, a fingerprint, or the like entered by the user using an input device during payment. This is not limited in this embodiment of the present disclosure. The emotion characteristic information of the user may include information such as an expression, a sound, and a sign of the user.

The emotion characteristic information may be obtained using sensors such as a camera, a microphone, a temperature sensor for detecting a body temperature, a heart rate sensor for detecting a heart rate, a pulse sensor for detecting pulses, a respiration sensor for detecting a respiratory frequency, and a blood oxygen sensor for detecting blood oxygen that are configured on a POS machine, a smartphone, a wearable device, and a self-service financial terminal, or sensors such as a camera, a microphone, a temperature sensor for detecting a body temperature, a heart rate sensor for detecting a heart rate, a pulse sensor for detecting pulses, a respiration sensor for detecting a respiratory frequency, and a blood oxygen sensor for detecting blood oxygen that are individually disposed but are in communication and connection with the foregoing terminal.

In step S102, after the authentication information entered by the user is obtained, authentication is first performed. After the authentication succeeds, that is, the authentication information is valid, whether the payment scenario is a normal payment scenario is determined according to the emotion characteristic information. If it indicates, according to the emotion characteristic information, that the user is in an abnormal emotional state during payment, for example, when the user is in an emotion such as nervousness, terror, fear, anxiety or anger, which is easily generated when a human being is threatened, it is determined that the current payment scenario is not a normal payment scenario. Otherwise, it is determined that the current payment scenario is a normal payment scenario.

In step S103, when the payment scenario is a normal payment scenario, the payment is completed. When the payment scenario is not a normal payment scenario, that is, is an abnormal payment scenario, a site of the payment is photographed or videotaped, the help information is sent to the outside world, or the like. In addition, a payment operation may be suspended or false payment success information may be returned in order to ensure safety of the user. This is not limited in this embodiment of the present disclosure.

It should be understood that in this embodiment of the present disclosure, it may be set that the method 100 is used only when a payment amount is greater than a specified amount. That is, a detection function is enabled when the amount is greater than a specified amount. When the payment amount is small, no great impact is caused to property of the user, and therefore, the detection function may not be enabled.

Therefore, according to the payment authentication method provided in this embodiment of the present disclosure, whether a payment scenario is a normal payment scenario is determined by obtaining emotion characteristic information that is generated when a user enters authentication information during payment, and security control is performed on the payment according to a determining result. This can improve security of the payment.

It should be understood that the emotion characteristic information may include at least one piece of related information of an expression, a sound, or a sign. That is, in this embodiment of the present disclosure, whether the payment scenario is a normal payment scenario may be determined using one of the expression, the sound, or the sign, or whether the payment scenario is a normal payment scenario may be determined using a combination of two or more than two of the expression, the sound, and the sign. This is not limited in this embodiment of the present disclosure.

Optionally, in an embodiment, the obtaining emotion characteristic information that is generated when the user enters the authentication information includes generating the emotion characteristic information according to a facial expression when the user enters the authentication information.

Further, when a payment behavior of the user occurs, the facial expression of the user when the user enters the authentication information may be detected using a camera or the like. Data such as an included angle between an eyebrow and an eye, a status of nostrils, and a status of corners of a mouth in the obtained facial expression of the user may be recognized using a facial expression recognition system, and then the emotion characteristic information is generated according to these pieces of data.

In this embodiment of the present disclosure, the facial expression recognition system may store expression units for expressing facial expressions, and a database of a correspondence between a combination of these expression units and an emotion that is conveyed by an expression. For example, current emotions of hatred and anger of the user that are formed due to expropriation of personal benefits or a loss of property are conveyed by a combination of these emotion units when the facial expression has the following characteristics wide open eyes, downward pulled corners of a mouth, a constrictive nose, a slightly forward inclined head. A current emotion of the user conveyed by a combination of these emotion units may be that the user realizes dangers but cannot get rid of the dangers when the facial expression of the user has the characteristics of clenched teeth, slightly closed eyes, and a head slightly swayed left and right. In addition, in this embodiment of the present disclosure, whether the payment scenario is a normal payment scenario may be further directly determined according to a comparison result of comparing data of the obtained facial expression such as an included angle between an eyebrow and an eye, with reference data. This is not limited in this embodiment of the present disclosure.

It should be understood that if conditions permit, more related information, for example, an upper-limb action, may be obtained to improve accuracy of emotion speculation.

Optionally, in an embodiment, the obtaining emotion characteristic information that is generated when the user enters the authentication information includes generating the emotion characteristic information according to a sound when the user enters the authentication information, where the emotion characteristic information includes at least one of tone information, speed information, amplitude information, or frequency information of the sound.

Further, when a payment behavior of the user occurs, the sound of the user when the user enters the authentication information may be detected using a sound sensor (for example, a microphone) or another sensor, to obtain information about the sound representing an emotion of the user. Obtained basic information about the sound of the user, for example, a tone, a speed, an amplitude, and a frequency of the sound, may be recognized using a sound recognition system. The speed and the tone when the user speaks may be determined according to the basic information about the sound. Whether there has been any abnormal change in the sound of the user during a period of time may be further determined according to the basic information in the period of time. For example, whether the sound of the user is disturbed or interrupted in the period of time.

The sound recognition system may store characteristic units for representing a sound, and a database of a correspondence between a combination of these characteristic units and an emotion that is conveyed by the sound. For example, when sound data of the user is disturbed or interrupted, it indicates that at present, the sound of the user may be trembling, and it may mean that the user is in danger. It should be understood that generally, credibility is relatively low if an emotion of the user is determined and whether the payment scenario is a normal payment scenario is further determined merely using the sound. Comprehensive determining needs to be performed in cooperation with expression data or sign data to improve accuracy of emotion speculation. In addition, in this embodiment of the present disclosure, whether the payment scenario is a normal payment scenario may be further directly determined according to a comparison result of comparing the obtained sound data with reference data. This is not limited in this embodiment of the present disclosure.

Optionally, in an embodiment, the obtaining emotion characteristic information that is generated when the user enters the authentication information includes generating the emotion characteristic information according to a sign when the user enters the authentication information, where the emotion characteristic information includes at least one of body temperature information, pulse information, respiration information, blood pressure information, blood oxygen information, or heart rate information.

Further, the sign in this embodiment of the present disclosure refers to a vital sign, including various vital signs such as a body temperature, pulses, breath, a blood pressure, blood oxygen, and a heart rate that can be detected using a sensor and that can help speculate an emotion of a person. When a person is in an emotion, the sign of the person also correspondingly changes. For example, when a person is in fear, the body temperature decreases, and when a person is threatened, the heart rate increases, and the blood pressure increases. When a payment behavior of the user occurs, if a smartphone or a wearable device used by the user has a sensor, sign information such as the body temperature, the pulses, the breath, the blood pressure, the blood oxygen, or the heart rate of the user may be obtained using a corresponding sensor.

A payment authentication apparatus may store a threshold of the sign, and a correspondence between a combination of signs and a conveyed emotion. When one or more pieces of the obtained sign information exceed normal thresholds, it may be speculated that the user is in an emotion of terror or nervousness. For example, when the body temperature of the user is less than a normal threshold, the heart rate is greater than a normal threshold, and the blood pressure is greater than a normal threshold, it may be speculated that the user is in an emotion of fear. In addition, in this embodiment of the present disclosure, whether the payment scenario is a normal payment scenario may be further directly determined according to a comparison result of comparing the obtained sign data such as a blood pressure or a heart rate, with reference data. This is not limited in this embodiment of the present disclosure.

Optionally, in an embodiment, determining, according to the emotion characteristic information, whether a payment scenario is a normal payment scenario includes comparing the emotion characteristic information with reference emotion characteristic information, and determining, according to a comparison result, whether the payment scenario is a normal payment scenario.

Further, after the emotion characteristic information such as the expression, the sound, and the sign is obtained, the emotion characteristic information may be compared with the reference emotion characteristic information, to determine whether the payment scenario is a normal payment scenario. The reference emotion characteristic information includes collected normal emotion characteristic information of the user and/or preset emotion characteristic information. That is, the reference emotion characteristic information may be preset reference information of ordinary persons obtained based on a large quantity of population samples, or may be reference information preset by a particular user merely for the user, or may be normal emotion characteristic information of the user collected using a camera, a microphone, and another sensor, a wearable device, or the like.

When determining whether the payment scenario is a normal payment scenario is executed by a payment terminal, for example, a smartphone or a wearable device used by the user, the reference emotion characteristic information may be preset by the user, or may be an exclusive normal emotional range of the user obtained through learning by collecting the individual emotion characteristic information of the particular user using a smartphone or a wearable device. The reference emotion characteristic information may be stored in a smartphone or a wearable device, or may be stored in cloud corresponding to an account associated with a user using the smartphone or the wearable device. When determining whether the payment scenario is a normal payment scenario is executed by a payment server, the reference emotion characteristic information may be pre-stored in the payment server. This is not limited in this embodiment of the present disclosure.

Whether the payment scenario is a normal payment scenario is determined according to a comparison result of comparing the emotion characteristic information with reference emotion characteristic information. Whether the payment scenario is a normal payment scenario may be determined by determining whether the facial expression of the user is consistent with a facial expression of the reference emotion characteristic information, by determining a difference between a sound of the user and a sound of the reference emotion characteristic information, or by comparing signs such as the body temperature, the pulses, the breath, the blood pressure, the blood oxygen, and the heart rate of the user with thresholds of signs of the reference emotion characteristic information. For example, when the facial expression of the user is not consistent with the facial expression of the reference emotion characteristic information, or when the difference between the sound of the user and the sound of the reference emotion characteristic information exceeds a specified extent, or when the body temperature, the pulses, the breath, the blood pressure, the blood oxygen, and the heart rate exceed specified absolute values of the signs of the reference emotion characteristic information, or exceed specified percentages of the signs of the reference emotion characteristic information, it is considered that the emotion characteristic information does not conform to the reference emotion characteristic information, and it is determined that the payment scenario is an abnormal payment scenario. Otherwise, the payment scenario is a normal payment scenario. This is not limited in this embodiment of the present disclosure.

Optionally, in an embodiment, the performing security control on the payment according to a result of determining whether the payment scenario is a normal payment scenario includes allowing the payment to be completed when the payment scenario is a normal payment scenario.

In other words, when the authentication information entered by the user is valid, and it is determined, according to the emotion characteristic information, that the payment scenario is a normal payment scenario, the payment is allowed to be completed. In addition, when the authentication information entered by the user is valid, but it is determined, according to the emotion characteristic information, that the payment scenario is not a normal payment scenario, that is, is an abnormal payment scenario, security control may be performed using multiple measures.

For example, it may be displayed to the user that this is abnormal payment, and a payment process is terminated such that the payment cannot be completed, and to ensure personal safety of the user, false information indicating "payment completed" may be further displayed to the user, but actually, a payment amount is not transferred. The payment amount is really deducted only when the user determines that it is normal payment afterward, or a payment amount allowed in an abnormal payment scenario is different from an amount allowed in a normal payment scenario, when a current scenario is an abnormal payment scenario, only a transaction whose amount is less than a particular amount is allowed to occur. For example, when it is detected that the body temperature of the user decreases, the heart rate increases, the blood pressure increases, and the expression is fear, it is speculated that the user is currently in a terrified emotion, and only an amount less than 300 RMB is allowed to be paid, or the payment is normally completed, but it is marked that this payment procedure is an abnormal procedure. The abnormal payment information is not displayed to the user during payment, but instead, confirmation is made with the user afterward. Moreover, it may be set that when the payment is abnormal, this payment may be canceled, and a specific used manner is not limited in this embodiment of the present disclosure.

Optionally, in an embodiment, performing security control on the payment according to a result of determining whether the payment scenario is a normal payment scenario includes photographing or videotaping a site of the payment when the payment scenario is not a normal payment scenario.

Further, when the authentication information entered by the user is valid, but it is determined, according to the emotion characteristic information, that the payment scenario is not a normal payment scenario, that is, is an abnormal payment scenario, the site of the payment is photographed or videotaped using a camera on a payment terminal or in communication and connection with a payment terminal, for example, a camera installed by a merchant, or a camera on a smartphone or a wearable device, to record a situation of the site as reference of subsequent processing.

Optionally, in an embodiment, performing security control on the payment according to a result of determining whether the payment scenario is a normal payment scenario includes sending help information to a preset contact when the payment scenario is not a normal payment scenario such that the contact determines a location of the payment scenario according to the help information.

Further, when the payment scenario is not a normal payment scenario, the location of the payment scenario may be determined, and the help information including the location is sent to the preset contact. When the payment terminal is a POS machine of a merchant, or an ATM, the location of the payment scenario may be code of the POS machine or the ATM. When the payment terminal is a smartphone or a wearable device used by the user, the location of the payment scenario may be a geographical location determined using a Global Positioning System (GPS) function of the smartphone or the wearable device. The preset contact may be a relative or a friend preset in the smartphone or the wearable device by the user, may be a contact that contacts the user most frequently and that is determined according to a call log of the user, or may be an emergency contact reserved in advance in a payment service system by the user. Alternatively, the preset contact may be a police service system. This is not limited in this embodiment of the present disclosure. When the payment scenario is not a normal payment scenario, related information about the location of the payment scenario may be further included in the help information sent to the preset contact. For example, the help information may include the code of the POS machine or the ATM, the geographical location determined using the GPS function, or a video or a photo that can indicate a site at which the payment occurs.

Therefore, according to the payment authentication method provided in this embodiment of the present disclosure, whether a payment scenario is a normal payment scenario is determined by obtaining emotion characteristic information that is generated when a user enters authentication information during payment. When the payment scenario is not a normal payment scenario, a site of the payment is recorded or information is sent to the outside world to ask for help in order to ensure personal safety and property security of the user.

Figure 2:
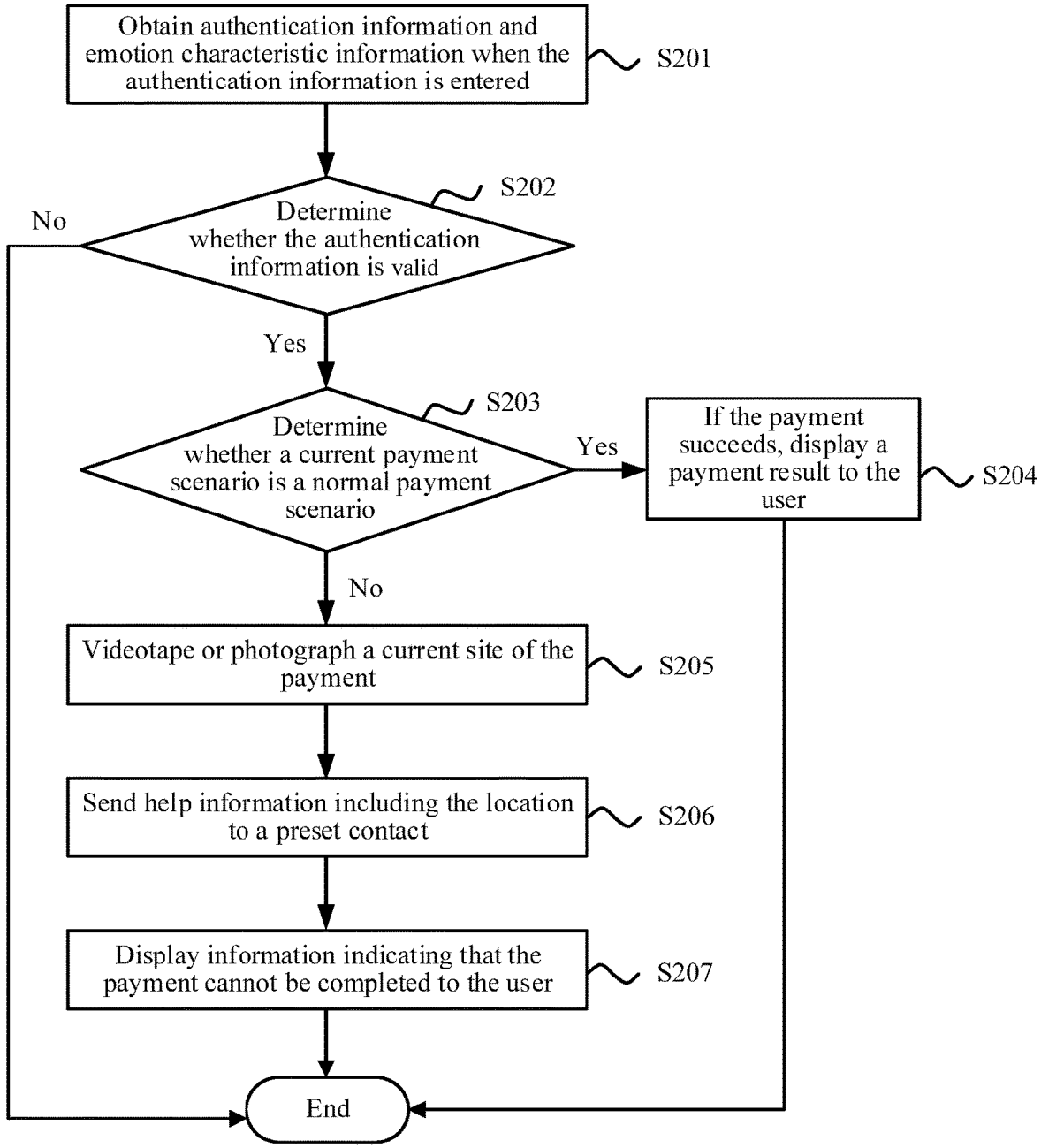
FIG. 2 is a schematic flowchart of a payment authentication method according to an embodiment of the present disclosure.

The payment authentication method in this embodiment of the present disclosure is described below using a detailed example. FIG. 2 is a payment authentication method 200 according to an embodiment of the present disclosure. As shown in FIG. 2, the method 200 includes the following steps.

Step S201: When a payment behavior occurs, obtain authentication information entered by a user, and collect an expression, a sound, and a sign when the user enters the authentication information to obtain emotion characteristic information that is generated when the user enters the authentication information, where the expression, the sound, and the sign are collected using a camera, a microphone, a sensor, and the like.

Step S202: Determine whether the authentication information is valid, when the authentication information is valid, perform step S203, or when the authentication information is invalid, the process ends.

Step S203: Compare the obtained emotion characteristic information with preset reference emotion characteristic information, and determine whether a current payment scenario is a normal payment scenario, when the payment scenario is a normal payment scenario, perform step S204, or when the payment scenario is not a normal payment scenario, perform step S205.

Step S204: If the payment succeeds, display a payment result to the user.

Step S205: Videotape or photograph a current site of the payment, and store a video or a photo for subsequent viewing.

Step S206: Determine a location of the payment scenario, and send help information including the location to a preset contact.

Step S207: Display information indicating that the payment cannot be completed to the user, or display false payment success information to the user, and subsequently, the process ends.

Therefore, according to the payment authentication method provided in this embodiment of the present disclosure, whether a payment scenario is a normal payment scenario is determined by obtaining emotion characteristic information that is generated when a user enters authentication information during payment. When the payment scenario is not a normal payment scenario, a site of the payment is recorded and information is sent to the outside world to ask for help in order to ensure personal safety and property security of the user.

Figure 3:
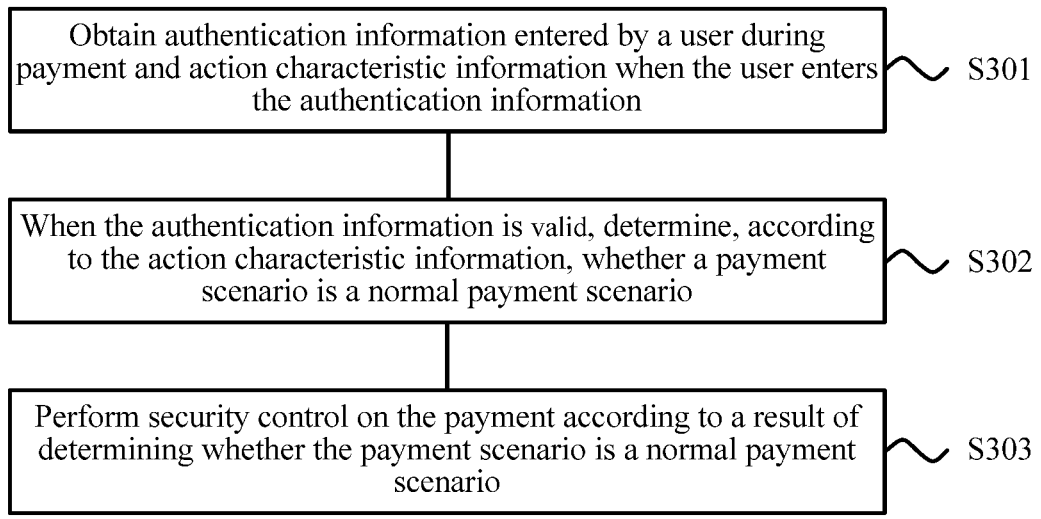
FIG. 3 is a schematic flowchart of a payment authentication method according to an embodiment of the present disclosure.

FIG. 3 is a schematic flowchart of a payment authentication method 300 according to an embodiment of the present disclosure. The method 300 is executed by a payment authentication apparatus, for example, an apparatus built in a terminal, or an independent device in communication and connection with a terminal. As shown in FIG. 3, the method 300 includes the following steps.

Step S301: Obtain authentication information entered by a user during payment and action characteristic information when the user enters the authentication information.

Step S302: When the authentication information is valid, determine, according to the action characteristic information, whether a payment scenario is a normal payment scenario.

Step S303: Perform security control on the payment according to a result of determining whether the payment scenario is a normal payment scenario.

Further, in the payment authentication in step S301, when the authentication information entered by the user is obtained, the action characteristic information when the user enters the authentication information is also obtained. The authentication information may include a password, a gesture, a fingerprint, or the like entered by the user using an input device during payment. This is not limited in this embodiment of the present disclosure. The action characteristic information of the user may include at least one of a force, a speed, a touch area, a displacement, or information about different fingers of pressing with a finger by the user. The action characteristic information may be obtained using a camera, a pressure sensor for detecting a force, and a sensor for detecting the speed, the touch area, the displacement, the information about the finger that are configured on a POS machine, a smartphone, a wearable device, and a self-service financial terminal, or a camera, a pressure sensor for detecting a force, and a sensor for detecting the speed, the touch area, the displacement, the information about the finger that are individually disposed but are in communication and connection with the foregoing terminal.

In step S302, after the authentication information entered by the user is obtained, authentication is first performed. After the authentication succeeds, that is, the authentication information is valid, whether the payment scenario is a normal payment scenario is determined according to the action characteristic information. If it indicates, according to the action characteristic information, that an action of the user during payment is different from a usual action or a preset action, for example, when a pressing force of a finger of the user exceeds a specified threshold, a pressing speed of a finger exceeds a specified threshold, a used finger is not a preset finger, or the like (this embodiment of the present disclosure is not limited thereto), it is determined that the current payment scenario is not a normal payment scenario. Otherwise, it is determined that the current payment scenario is a normal payment scenario.

In step S303, when the payment scenario is a normal payment scenario, the payment is completed. When the payment scenario is not a normal payment scenario, that is, is an abnormal payment scenario, a site of the payment is photographed or videotaped, the help information is sent to the outside world, or the like. In addition, a payment operation may be suspended or false payment success information may be returned in order to ensure safety of the user. This is not limited in this embodiment of the present disclosure.

It should be understood that in this embodiment of the present disclosure, it may be set that the method 300 is used only when a payment amount is greater than a specified amount. That is, a detection function is enabled when the amount is greater than a specified amount. When the payment amount is small, no great impact is caused to property of the user, and therefore, the detection function may not be enabled.

Therefore, according to the payment authentication method provided in this embodiment of the present disclosure, whether a payment scenario is a normal payment scenario is determined by obtaining action characteristic information when a user enters authentication information during payment, and security control is performed on the payment according to a determining result. This can improve security of the payment.

Optionally, in an embodiment, the authentication information is fingerprint information, and the action characteristic information includes at least one of force information, speed information, touch area information, displacement information, or particular finger information of pressing with a finger when fingerprint payment is used.

Further, when a payment behavior of the user occurs, especially when the user performs payment using a fingerprint, a finger action of the user when the user enters the authentication information may be detected using a sensor, to obtain the action characteristic information, for example, at least one of the force information, the speed information, the touch area information, the displacement information, or the particular finger information of pressing with the finger. Subsequently, whether the payment scenario is a normal payment scenario is determined according to the action characteristic information. The user may predefine a relationship between abnormal payment and an action, for example, the user may define a correspondence between a pressing force and the abnormal payment, and when the user uses fingerprint payment, a pressing force of a finger exceeds a specified threshold or exceeds a threshold by a specified percentage, it is determined that it is currently the abnormal payment, or the user may define a correspondence between a pressing speed and the abnormal payment, and when the user uses fingerprint payment, a pressing speed of a finger exceeds a specified threshold or exceeds a threshold by a specified percentage, it is determined that it is currently the abnormal payment, the user may define a correspondence between a touch area of a finger in pressing and the abnormal payment, and when the user uses fingerprint payment, if a touch area when a finger presses a collection apparatus does not reach a threshold or is less than a threshold by a specified percentage, it is determined that it is currently the abnormal payment, the user may define a correspondence between a movement of a finger in pressing and the abnormal payment, and when the user uses fingerprint payment, if the finger is moved (for example, slides forward/backward/left/right by a small distance), it is determined that it is currently the abnormal payment, or the user may define a correspondence between different fingers and the abnormal payment, and when using fingerprint payment, the user presses with a particular finger, where normal payment is indicated if the user performs payment using the right forefinger, and the abnormal payment is indicated if the user performs payment using the left forefinger.

It should be understood that if conditions permit, a body movement of the user may also be obtained to help comprehensively determine whether the current payment scenario is a normal payment scenario in order to improve accuracy of determining.

Optionally, in an embodiment, determining, according to the action characteristic information, whether a payment scenario is a normal payment scenario includes comparing the action characteristic information with proper action characteristic information, and determining, according to a comparison result, whether the payment scenario is a normal payment scenario. Further, after the action characteristic information is obtained, the action characteristic information may be compared with the proper action characteristic information, to determine whether the payment scenario is a normal payment scenario. The proper action characteristic information includes experience information conforming to historical payment and/or information conforming to information preset by the user. That is, the proper action characteristic information may be reference information of ordinary persons obtained based on a large quantity of population samples, or may be reference information pre-stored by a particular user merely for the user.

Preferably, the proper action characteristic information is information corresponding to an action preset by the user to facilitate security control during payment. For example, the user may preset that in danger, pressing is performed with a finger at a force exceeding a specified threshold, or in danger, authentication is performed using the left forefinger, while in a normal case, authentication is performed using the right forefinger.

When determining whether the payment scenario is a normal payment scenario is executed by a payment terminal, for example, a smartphone or a wearable device used by the user, the proper action characteristic information may be predefined by the user, or may be an exclusive normal range of the user obtained through learning according to data of the particular individual user using a smartphone or a wearable device. The proper action characteristic information may be stored in a smartphone or a wearable device, or may be stored in cloud corresponding to an account associated with a user using the smartphone or the wearable device. When determining whether the payment scenario is a normal payment scenario is executed by a payment server, the proper action characteristic information may be pre-stored in the payment server. This is not limited in this embodiment of the present disclosure. When the action characteristic information conforms to the proper action characteristic information, that is, data of the action characteristic information of the user is within a data range of the proper action characteristic information, or an absolute value of a value or a percentage by which data of the action characteristic information of the user exceeds data of the proper action characteristic information is within a preset range, it is determined that the payment scenario is a normal payment scenario. Otherwise, the payment scenario is an abnormal payment scenario.

Optionally, in an embodiment, performing security control on the payment according to a result of determining whether the payment scenario is a normal payment scenario includes allowing the payment to be completed when the payment scenario is a normal payment scenario.

Optionally, in an embodiment, performing security control on the payment according to a result of determining whether the payment scenario is a normal payment scenario includes photographing or videotaping a site of the payment when the payment scenario is not a normal payment scenario.

Optionally, in an embodiment, performing security control on the payment according to a result of determining whether the payment scenario is a normal payment scenario includes sending help information to a preset contact when the payment scenario is not a normal payment scenario such that the contact determines a location of the payment scenario according to the help information, where performing security control on the payment according to a result of determining whether the payment scenario is a normal payment scenario is similar to that in the method 100, and details are not described herein again.

Therefore, according to the payment authentication method provided in this embodiment of the present disclosure, whether a payment scenario is a normal payment scenario is determined by obtaining action characteristic information when a user enters authentication information during payment. When the payment scenario is not a normal payment scenario, a site of the payment is recorded or information is sent to the outside world to ask for help in order to ensure personal safety and property security of the user.

Figure 4:
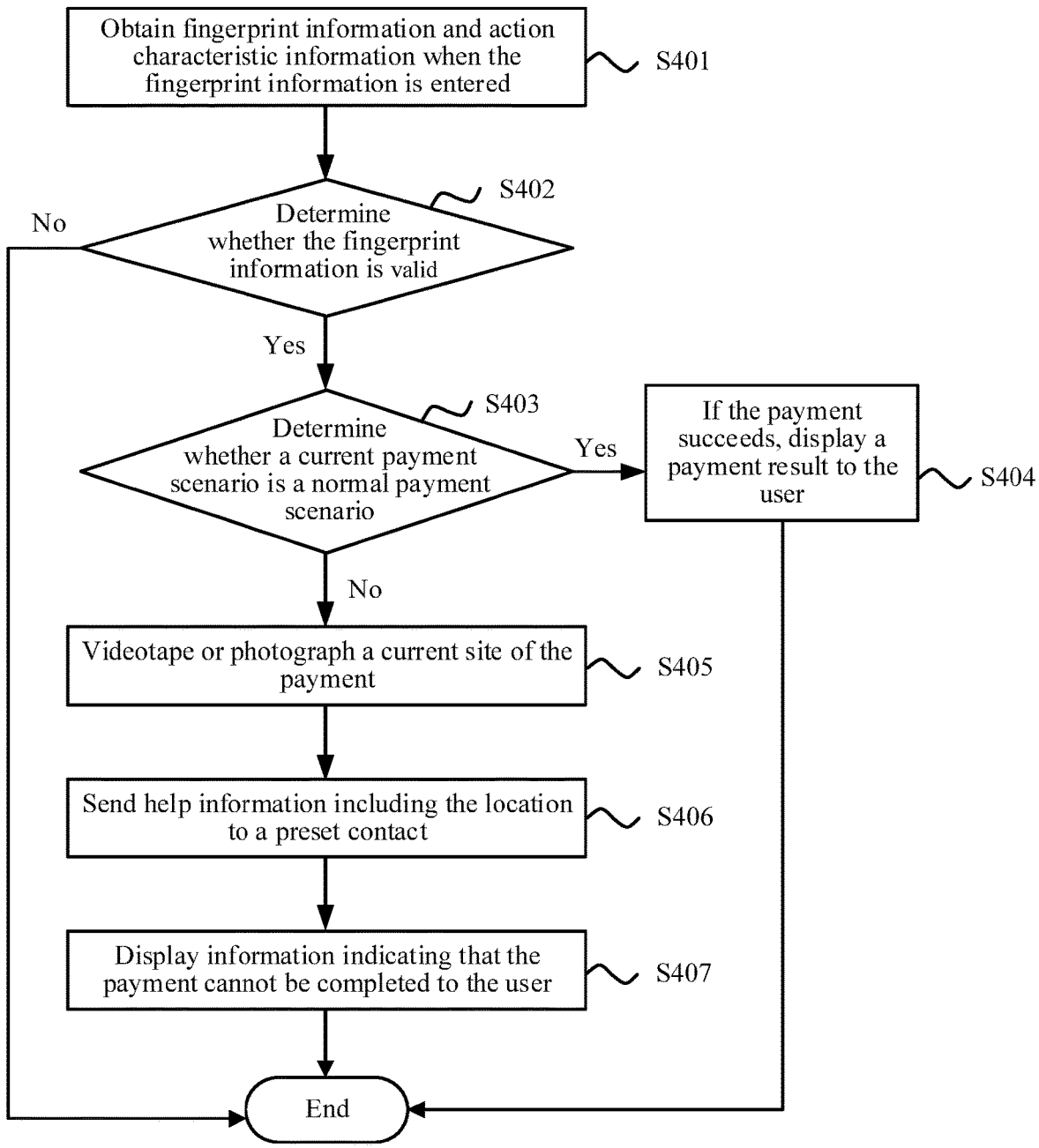
FIG. 4 is a schematic flowchart of a payment authentication method according to an embodiment of the present disclosure.

The payment authentication method in this embodiment of the present disclosure is described below using a detailed example. FIG. 4 is a payment authentication method 400 according to an embodiment of the present disclosure. As shown in FIG. 4, the method 400 includes the following steps.

Step S401: When a payment behavior occurs, obtain fingerprint information entered by a user, and collect a finger action when the user enters the fingerprint information to obtain action characteristic information when the user enters the fingerprint information, where the action characteristic information may include at least one of force information, speed information, touch area information, displacement information, or information about different fingers of pressing with a finger when fingerprint payment is used.

Step S402: Determine whether the fingerprint information is valid, and when the fingerprint information is valid, perform step S403, or when the fingerprint information is invalid, the process ends.

Step S403: Compare the obtained action characteristic information with preset proper action characteristic information, and determine whether a current payment scenario is a normal payment scenario. When the payment scenario is a normal payment scenario, perform step S404, or when the payment scenario is not a normal payment scenario, perform step S405.

Step S404: If the payment succeeds, display a payment result to the user.

Step S405: Videotape or photograph a current site of the payment, and store a video or a photo for subsequent viewing.

Step S406: Determine a location of the payment scenario, and send help information including the location to a preset contact.

Step S407: Display information indicating that the payment cannot be completed to the user, or display false payment success information to the user, and subsequently, the process ends.

Therefore, according to the payment authentication method provided in this embodiment of the present disclosure, whether a payment scenario is a normal payment scenario is determined by obtaining action characteristic information when a user enters authentication information during payment. When the payment scenario is not a normal payment scenario, a site of the payment is recorded and information is sent to the outside world to ask for help in order to ensure personal safety and property security of the user.

The payment authentication methods according to the embodiments of the present disclosure are described in detail above with reference to FIG. 1 to FIG. 4, and payment authentication apparatuses according to embodiments of the present disclosure are described in detail below with reference to FIG. 5 to FIG. 8.

Figure 5:
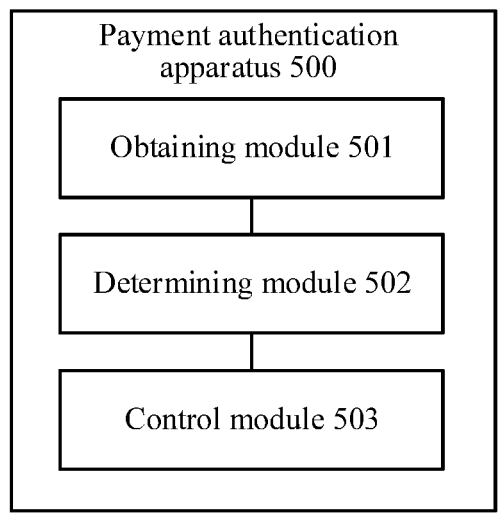
FIG. 5 is a schematic block diagram of a payment authentication apparatus according to an embodiment of the present disclosure.

FIG. 5 is a schematic block diagram of a payment authentication apparatus 500 according to an embodiment of the present disclosure. The payment authentication apparatus 500 includes an obtaining module 501 configured to obtain authentication information entered by a user during payment and emotion characteristic information that is generated when the user enters the authentication information, a determining module 502 configured to determine, according to the emotion characteristic information obtained by the obtaining module 501, whether a payment scenario is a normal payment scenario when the authentication information obtained by the obtaining module 501 is valid, and a control module 503 configured to perform security control on the payment according to a result of determining, by the determining module 502, whether the payment scenario is a normal payment scenario.

Therefore, according to the payment authentication apparatus 500 provided in this embodiment of the present disclosure, whether a payment scenario is a normal payment scenario is determined by obtaining emotion characteristic information that is generated when a user enters authentication information during payment, and security control is performed on the payment according to a determining result. This can improve security of the payment.

Optionally, in an embodiment, the determining module 502 is further configured to compare the emotion characteristic information obtained by the obtaining module 501 with reference emotion characteristic information when the authentication information obtained by the obtaining module 501 is valid, and determine, according to a comparison result, whether the payment scenario is a normal payment scenario.

Optionally, in an embodiment, the control module 503 is further configured to photograph or videotape a site of the payment when the payment scenario is not a normal payment scenario.

Optionally, in an embodiment, the control module 503 is further configured to send help information to a preset contact when the payment scenario is not a normal payment scenario such that the contact determines a location of the payment scenario according to the help information.

Optionally, in an embodiment, the control module 503 is further configured to allow the payment to be completed when the payment scenario is a normal payment scenario.

Optionally, in an embodiment, the obtaining module 501 is further configured to obtain the authentication information entered by the user during the payment and a facial expression when the user enters the authentication information, and generate the emotion characteristic information according to the facial expression when the user enters the authentication information.

Optionally, in an embodiment, the obtaining module 501 is further configured to obtain the authentication information entered by the user during the payment and a sound when the user enters the authentication information, and generate the emotion characteristic information according to the sound when the user enters the authentication information, where the emotion characteristic information includes at least one of tone information, speed information, amplitude information, or frequency information of the sound.

Optionally, in an embodiment, the obtaining module 501 is further configured to obtain the authentication information entered by the user during the payment and a sign when the user enters the authentication information, and generate the emotion characteristic information according to the sign when the user enters the authentication information, where the emotion characteristic information includes at least one of body temperature information, pulse information, respiration information, blood pressure information, blood oxygen information, or heart rate information.

It should be understood that the payment authentication apparatus 500 according to this embodiment of the present disclosure may correspond to an entity executing the method 100 in the embodiment of the present disclosure, and the foregoing and other operations and/or functions of modules in the payment authentication apparatus 500 are used to implement corresponding procedures of the methods in FIG. 1 and FIG. 2. For brevity, details are not described herein again.

Therefore, according to the payment authentication apparatus 500 provided in this embodiment of the present disclosure, whether a payment scenario is a normal payment scenario is determined by obtaining emotion characteristic information that is generated when a user enters authentication information during payment, and security control is performed on the payment according to a determining result. This can improve security of the payment.

Figure 6:
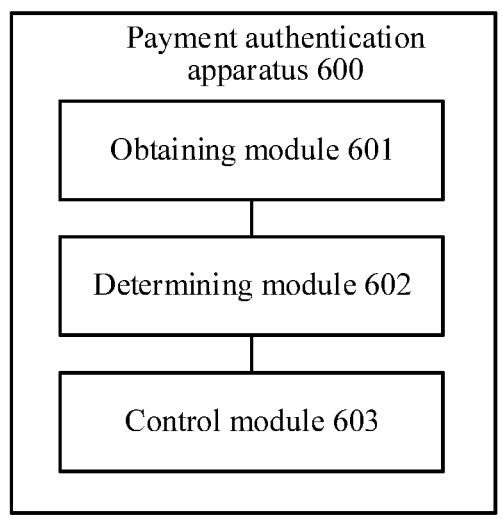
FIG. 6 is a schematic block diagram of a payment authentication apparatus according to an embodiment of the present disclosure.

FIG. 6 is a schematic block diagram of a payment authentication apparatus 600 according to an embodiment of the present disclosure. The payment authentication apparatus 600 includes an obtaining module 601 configured to obtain authentication information entered by a user during payment and action characteristic information when the user enters the authentication information, a determining module 602 configured to determine, according to the action characteristic information obtained by the obtaining module 601, whether a payment scenario is a normal payment scenario when the authentication information obtained by the obtaining module 601 is valid, and a control module 603 configured to perform security control on the payment according to a result of determining, by the determining module 602, whether the payment scenario is a normal payment scenario.

Therefore, according to the payment authentication apparatus 600 provided in this embodiment of the present disclosure, whether a payment scenario is a normal payment scenario is determined by obtaining action characteristic information when a user enters authentication information during payment, and security control is performed on the payment according to a determining result. This can improve security of the payment.

Optionally, in an embodiment, the determining module 602 is further configured to compare the action characteristic information obtained by the obtaining module 601 with proper action characteristic information when the authentication information obtained by the obtaining module 601 is valid, and determine, according to a comparison result, whether the payment scenario is a normal payment scenario.

Optionally, in an embodiment, the control module 603 is further configured to photograph or videotape a site of the payment when the payment scenario is not a normal payment scenario.

Optionally, in an embodiment, the control module 603 is further configured to send help information to a preset contact when the payment scenario is not a normal payment scenario such that the contact determines a location of the payment scenario according to the help information.

Optionally, in an embodiment, the control module 603 is further configured to allow the payment to be completed when the payment scenario is a normal payment scenario.

Optionally, in an embodiment, the authentication information is fingerprint information, and the action characteristic information includes at least one of force information, speed information, touch area information, displacement information, or particular finger information of pressing with a finger when fingerprint payment is used.

It should be understood that the payment authentication apparatus 600 according to this embodiment of the present disclosure may correspond to an entity executing the method 200 in the embodiment of the present disclosure, and the foregoing and other operations and/or functions of modules in the payment authentication apparatus 600 are used to implement corresponding procedures of the methods in FIG. 3 and FIG. 4. For brevity, details are not described herein again.

Therefore, according to the payment authentication apparatus 600 provided in this embodiment of the present disclosure, whether a payment scenario is a normal payment scenario is determined by obtaining action characteristic information when a user enters authentication information during payment, and security control is performed on the payment according to a determining result. This can improve security of the payment.

Figure 7:
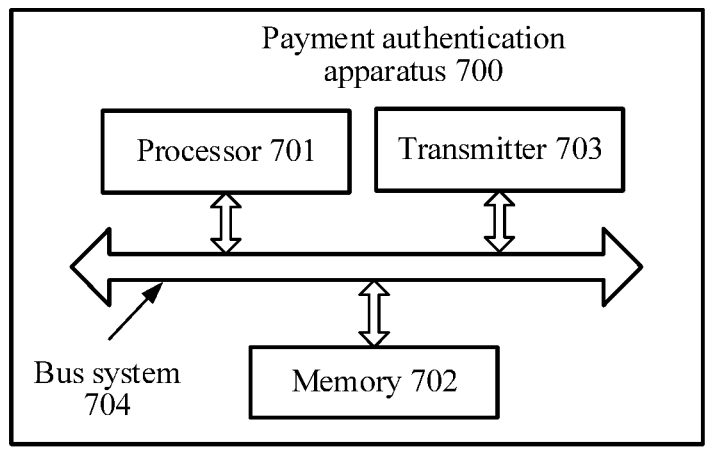
FIG. 7 is a schematic block diagram of a payment authentication apparatus according to an embodiment of the present disclosure.

As shown in FIG. 7, an embodiment of the present disclosure further provides a payment authentication apparatus 700. The apparatus 700 includes a processor 701, a memory 702, a transmitter 703, and a bus system 704. The processor 701, the memory 702, and the transmitter 703 are connected to each other using the bus system 704. The memory 702 is configured to store an instruction, and the processor 701 is configured to execute the instruction stored in the memory 702. The processor 701 is configured to obtain authentication information entered by a user during payment and emotion characteristic information that is generated when the user enters the authentication information, determine, according to the emotion characteristic information, whether a payment scenario is a normal payment scenario when the authentication information is valid, and perform security control on the payment according to a result of determining whether the payment scenario is a normal payment scenario.

Therefore, according to the payment authentication apparatus 700 provided in this embodiment of the present disclosure, whether a payment scenario is a normal payment scenario is determined by obtaining emotion characteristic information that is generated when a user enters authentication information during payment, and security control is performed on the payment according to a determining result. This can improve security of the payment.

It should be understood that in this embodiment of the present disclosure, the processor 701 may be a central processing unit (CPU), or the processor 701 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor or the processor 701 may be any conventional processor or the like.

The memory 702 may include a read-only memory (ROM) and a random access memory (RAM), and provide an instruction and data to the processor 701. A part of the memory 702 may further include a non-volatile RAM. For example, the memory 702 may further store device type information.

The bus system 704 may further include a power bus, a control bus, a status signal bus, and the like in addition to a data bus. However, for clear description, various types of buses in the figure are marked as the bus system 704.

In an implementation process, the steps of the foregoing method may be completed using an integrated logic circuit of hardware in the processor 701 or an instruction in a software form. Steps of the methods disclosed with reference to the embodiments of the present disclosure may be directly performed and completed by means of a hardware processor, or may be performed and completed using a combination of hardware and software modules in the processor 701. The software module may be located in a mature storage medium in the field such as a RAM, a flash memory, a ROM, a programmable ROM (PROM), an electrically-erasable PROM (EEPROM), or a register. The storage medium is located in the memory 702, and the processor 701 reads information in the memory 702 and completes the steps in the foregoing methods in combination with hardware of the processor 701. To avoid repetition, details are not described herein again.

Optionally, in an embodiment, the processor 701 is further configured to compare the emotion characteristic information with reference emotion characteristic information when the authentication information is valid, and determine, according to a comparison result, whether the payment scenario is a normal payment scenario.

Optionally, in an embodiment, the processor 701 is further configured to photograph or videotape a site of the payment when the payment scenario is not a normal payment scenario.

Optionally, in an embodiment, the transmitter 703 is further configured to send help information to a preset contact when the payment scenario is not a normal payment scenario such that the contact determines a location of the payment scenario according to the help information.

Optionally, in an embodiment, the processor 701 is further configured to allow the payment to be completed when the payment scenario is a normal payment scenario.

Optionally, in an embodiment, the processor 701 is further configured to obtain the authentication information entered by the user during the payment and a facial expression when the user enters the authentication information, and generate the emotion characteristic information according to the facial expression when the user enters the authentication information.

Optionally, in an embodiment, the processor 701 is further configured to obtain the authentication information entered by the user during the payment and a sound when the user enters the authentication information, and generate the emotion characteristic information according to the sound when the user enters the authentication information, where the emotion characteristic information includes at least one of tone information, speed information, amplitude information, or frequency information of the sound.

Optionally, in an embodiment, the processor 701 is further configured to obtain the authentication information entered by the user during the payment and a sign when the user enters the authentication information, and generate the emotion characteristic information according to the sign when the user enters the authentication information, where the emotion characteristic information includes at least one of body temperature information, pulse information, respiration information, blood pressure information, blood oxygen information, or heart rate information.

It should be understood that the payment authentication apparatus 700 according to this embodiment of the present disclosure may correspond to an entity executing the method 100 in the embodiment of the present disclosure, or may correspond to the payment authentication apparatus 500 according to the embodiment of the present disclosure, and the foregoing and other operations and/or functions of modules in the payment authentication apparatus 700 are used to implement corresponding procedures of the methods in FIG. 1 and FIG. 2. For brevity, details are not described herein again.

Therefore, according to the payment authentication apparatus 700 provided in this embodiment of the present disclosure, whether a payment scenario is a normal payment scenario is determined by obtaining emotion characteristic information that is generated when a user enters authentication information during payment, and security control is performed on the payment according to a determining result. This can improve security of the payment.

Figure 8:
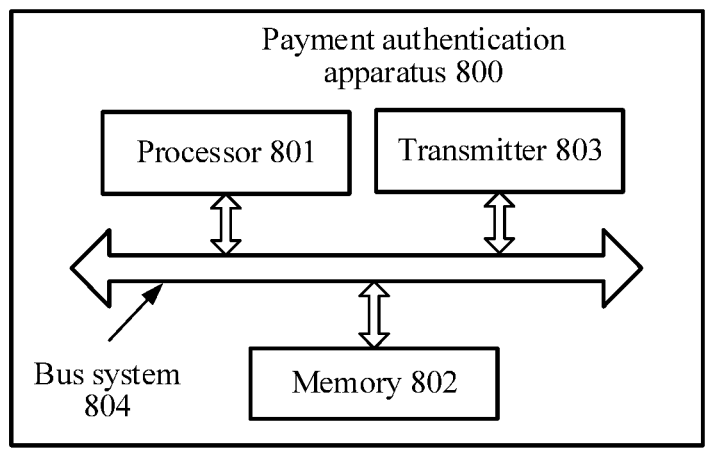
FIG. 8 is a schematic block diagram of a payment authentication apparatus according to an embodiment of the present disclosure.

As shown in FIG. 8, an embodiment of the present disclosure further provides a payment authentication apparatus 800. The apparatus 800 includes a processor 801, a memory 802, a transmitter 803, and a bus system 804. The processor 801, the memory 802, and the transmitter 803 are connected to each other using the bus system 804. The memory 802 is configured to store an instruction, and the processor 801 is configured to execute the instruction stored in the memory 802. The processor 801 is configured to obtain authentication information entered by a user during payment and action characteristic information when the user enters the authentication information, determine, according to the action characteristic information, whether a payment scenario is a normal payment scenario when the authentication information is valid, and perform security control on the payment according to a result of determining whether the payment scenario is a normal payment scenario.

Therefore, according to the payment authentication apparatus 800 provided in this embodiment of the present disclosure, whether a payment scenario is a normal payment scenario is determined by obtaining action characteristic information when a user enters authentication information during payment, and security control is performed on the payment according to a determining result. This can improve security of the payment.

It should be understood that in this embodiment of the present disclosure, the processor 801 may be a CPU, or the processor 801 may be another general purpose processor, a DSP, an ASIC, an FPGA, or another programmable logic device, discrete gate or transistor logic device, discrete hardware component, or the like. The general purpose processor may be a microprocessor or the processor 801 may be any conventional processor or the like.

The memory 802 may include a ROM and a RAM, and provide an instruction and data to the processor 801. A part of the memory 802 may further include a non-volatile RAM. For example, the memory 802 may further store device type information.

The bus system 804 may further include a power bus, a control bus, a status signal bus, and the like in addition to a data bus. However, for clear description, various types of buses in the figure are marked as the bus system 804.

In an implementation process, the steps of the foregoing method may be completed using an integrated logic circuit of hardware in the processor 801 or an instruction in a software form. Steps of the methods disclosed with reference to the embodiments of the present disclosure may be directly performed and completed by means of a hardware processor, or may be performed and completed using a combination of hardware and software modules in the processor 801. The software module may be located in a mature storage medium in the field such as a RAM, a flash memory, a ROM, a PROM, an EEPROM, or a register. The storage medium is located in the memory 802, and the processor 801 reads information in the memory 802 and completes the steps in the foregoing methods in combination with hardware of the processor 801. To avoid repetition, details are not described herein again.

Optionally, in an embodiment, the processor 801 is further configured to compare the action characteristic information with proper action characteristic information when the authentication information is valid, and determine, according to a comparison result, whether the payment scenario is a normal payment scenario.

Optionally, in an embodiment, the processor 801 is further configured to photograph or videotape a site of the payment when the payment scenario is not a normal payment scenario.

Optionally, in an embodiment, the transmitter 803 is further configured to send help information to a preset contact when the payment scenario is not a normal payment scenario such that the contact determines a location of the payment scenario according to the help information.

Optionally, in an embodiment, the processor 801 is further configured to allow the payment to be completed when the payment scenario is a normal payment scenario.

Optionally, in an embodiment, the authentication information is fingerprint information, and the action characteristic information includes at least one of force information, speed information, touch area information, displacement information, or particular finger information of pressing with a finger when fingerprint payment is used.

It should be understood that the payment authentication apparatus 800 according to this embodiment of the present disclosure may correspond to an entity executing the method 200 in the embodiment of the present disclosure, or may correspond to the payment authentication apparatus 600 according to the embodiment of the present disclosure, and the foregoing and other operations and/or functions of modules in the payment authentication apparatus 800 are used to implement corresponding procedures of the methods in FIG. 3 and FIG. 4. For brevity, details are not described herein again.

Therefore, according to the payment authentication apparatus 800 provided in this embodiment of the present disclosure, whether a payment scenario is a normal payment scenario is determined by obtaining action characteristic information when a user enters authentication information during payment, and security control is performed on the payment according to a determining result. This can improve security of the payment.

It should be understood that in the embodiments of the present disclosure, "X corresponding to Y" indicates that Y is associated with X, and Y may be determined according to X. However, it should be further understood that determining Y according to X does not mean that Y is determined according to X only, that is, Y may also be determined according to X and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication and connections may be implemented through some interfaces. The indirect couplings or communication and connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes any medium that can store program code such as a universal serial bus (USB) flash drive, a removable hard disk, a ROM, a RAM, a magnetic disk, or an optical disc.

What is claimed is:

1. A payment authentication method, comprising:
   obtaining authentication information entered by a user during payment;
   generating emotion characteristic information according to a combination of current facial expressions of the user when the user enters the authentication information, wherein generating the emotion characteristic information comprises:
   detecting the combination of current facial expressions of the user through a camera;
   recognizing data corresponding to emotions conveyed by the combination of current facial expressions through a facial expression recognition system, wherein the facial expression recognition system stores expression units for expressing facial expressions, and a database of a correspondence between a combination of the expression units and the emotions conveyed by the combination of current facial expressions including clenched teeth, closed or open eyes, a constrictive nose, or a head swayed left and right; and
   generating the emotion characteristic information according to the data;
   determining, according to the emotion characteristic information, whether a payment scenario is a normal payment scenario when the authentication information is valid;
   performing security control on the payment according to whether the payment scenario is the normal payment scenario; and
   photographing or videotaping a site of the payment when the payment scenario is not the normal payment scenario.

2. The payment authentication method of claim 1, wherein determining whether the payment scenario is the normal payment scenario comprises:
   comparing the emotion characteristic information with reference emotion characteristic information; and
   determining, according to a comparison result, whether the payment scenario is the normal payment scenario.

3. The payment authentication method of claim 1, wherein performing the security control on the payment comprises sending help information to a preset contact when the payment scenario is not the normal payment scenario.

4. The payment authentication method of claim 1, further comprising generating the emotion characteristic information according to a sound when the user enters the authentication information, wherein the sound comprises at least one of tone information, speed information, amplitude information, or frequency information of the sound of the user.

5. The payment authentication method of claim 1, further comprising generating the emotion characteristic information according to a sign when the user enters the authentication information, wherein the sign comprises at least one of body temperature information, pulse information, respiration information, blood pressure information, blood oxygen information, or heart rate information of the user.

6. The payment authentication method of claim 1, further comprising:
   obtaining current action characteristic information when the user enters the authentication information, wherein the current action characteristic information comprises at least one of speed information, touch area information, displacement information, or particular finger information of pressing with a finger when fingerprint payment is used; and determining, according to the current action characteristic information, whether a payment scenario is a normal payment scenario when the authentication information is valid.

7. The payment authentication method of claim 6, wherein determining whether the payment scenario is the normal payment scenario comprises:

comparing the current action characteristic information with proper action characteristic information; and determining, according to a comparison result, whether the payment scenario is the normal payment scenario.

8. The payment authentication method of claim 6, wherein the authentication information is fingerprint information.

9. The payment authentication method of claim 1, further comprising displaying a payment result to the user when the payment scenario is the normal payment scenario.

10. The payment authentication method of claim 1, further comprising suspending the payment when the payment scenario is not the normal payment scenario.

11. A payment authentication apparatus, comprising:

a memory; and a processor coupled to the memory and configured to:

obtain authentication information entered by a user during payment;

generate emotion characteristic information according to a combination of current facial expressions of the user when the user enters the authentication information, wherein when generating the emotion characteristic information, the processor is further configured to:

detect the combination of current facial expressions of the user through a camera;

recognize data corresponding to emotions conveyed by the combination of the current facial expressions through a facial expression recognition system, wherein the facial expression recognition system stores expression units for expressing facial expressions, and a database of a correspondence between a combination of the expression units and the emotions conveyed by the combination of the current facial expressions including clenched teeth, closed or open eyes, a constrictive nose, or a head swayed left and right; and generate the emotion characteristic information according to the data;

determine, according to the emotion characteristic information, whether a payment scenario is a normal payment scenario when the authentication information is valid;

perform security control on the payment according to whether the payment scenario is the normal payment scenario; and photograph or videotape a site of the payment when the payment scenario is not the normal payment scenario.

12. The payment authentication apparatus of claim 11, wherein when the authentication information is valid, the processor is further configured to:

compare the emotion characteristic information with reference emotion characteristic information; and determine, according to a comparison result, whether the payment scenario is the normal payment scenario.

13. The payment authentication apparatus of claim 11, further comprising a transmitter, wherein the transmitter is configured to send help information to a preset contact when the payment scenario is not the normal payment scenario.

14. The payment authentication apparatus of claim 11, wherein the processor is further configured to:

obtain a sound when the user enters the authentication information; and generate the emotion characteristic information according to the sound when the user enters the authentication information, and wherein the sound comprises at least one of tone information, speed information, amplitude information, or frequency information of the sound of the user.

15. The payment authentication apparatus of claim 11, wherein the processor is further configured to:

obtain a sign when the user enters the authentication information; and generate the emotion characteristic information according to the sign when the user enters the authentication information, and wherein the sign comprises at least one of body temperature information, pulse information, respiration information, blood pressure information, blood oxygen information, or heart rate information of the user.

16. The payment authentication apparatus of claim 11, wherein the processor is further configured to:

obtain action characteristic information when the user enters the authentication information, wherein the action characteristic information comprises at least one of speed information, touch area information, displacement information, or particular finger information of pressing with a finger when fingerprint payment is used; and determine, according to the action characteristic information, whether a payment scenario is a normal payment scenario when the authentication information is valid.

17. The payment authentication apparatus of claim 16, wherein when the authentication information is valid, the processor is further configured to:

compare the action characteristic information with proper action characteristic information; and determine, according to a comparison result, whether the payment scenario is the normal payment scenario.

18. The payment authentication apparatus of claim 16, wherein the authentication information is fingerprint information.

19. The payment authentication apparatus of claim 11, wherein the processor is further configured to display a payment result to the user when the payment scenario is the normal payment scenario.

20. The payment authentication apparatus of claim 11, wherein the processor is further configured to suspend the payment when the payment scenario is not the normal payment scenario.

* * * * *